United States Patent
Hafner et al.

(10) Patent No.: US 10,213,728 B2
(45) Date of Patent: Feb. 26, 2019

(54) METHOD FOR SEPARATING CARBON DIOXIDE FROM A GAS FLOW, IN PARTICULAR FROM A FLUE GAS FLOW, AND SEPARATING DEVICE FOR SEPARATING CARBON DIOXIDE FROM A GAS FLOW, IN PARTICULAR FROM A FLUE GAS FLOW

(71) Applicant: Siemens Aktiengesellschaft, Munich (DE)

(72) Inventors: Benjamin Hafner, Langenselbold (DE); Ansgar Kursawe, Niedernhausen (DE); Albert Reichl, Bad Soden (DE); Rudiger Schneider, Eppstein (DE); Henning Schramm, Frankfurt am Main (DE)

(73) Assignee: Siemens Aktiengesellschaft, Munich (DE)

( * ) Notice: Subject to any disclaimer, the term of this patent is extended or adjusted under 35 U.S.C. 154(b) by 490 days.

(21) Appl. No.: 14/898,136

(22) PCT Filed: Jun. 12, 2014

(86) PCT No.: PCT/EP2014/062187
§ 371 (c)(1),
(2) Date: Dec. 13, 2015

(87) PCT Pub. No.: WO2014/202448
PCT Pub. Date: Dec. 24, 2014

(65) Prior Publication Data
US 2016/0206991 A1 Jul. 21, 2016

(30) Foreign Application Priority Data
Jun. 21, 2013 (DE) .......... 10 2013 211 757

(51) Int. Cl.
*B01D 15/36* (2006.01)
*B01D 53/14* (2006.01)
(Continued)

(52) U.S. Cl.
CPC ....... *B01D 53/1425* (2013.01); *B01D 15/361* (2013.01); *B01D 53/1475* (2013.01);
(Continued)

(58) Field of Classification Search
CPC ........ B01D 2311/04; B01D 2311/2626; B01D 15/36; B01D 15/361; B01D 2252/20494;
(Continued)

(56) References Cited

U.S. PATENT DOCUMENTS 4,444,571 A 4/1984 Matson
5,292,407 A * 3/1994 Roy .................. B01D 53/1425
205/431
(Continued)

FOREIGN PATENT DOCUMENTS

EP 1021375 B1 7/2004
EP 2559473 A1 2/2013
(Continued)

OTHER PUBLICATIONS

Kohl A. L. et al; "Gas purification, Fifth edition, Chapter 3: Mechanical Design and Operation of Alkanolamine Plants"; GAS Pufification, Gulf Publishing Company, Houston; ISBN: 978-0-88415-220-0; 1997.

*Primary Examiner* — Carbrena Holecek
(74) *Attorney, Agent, or Firm* — Beusse Wolter Sanks & Maire

(57) ABSTRACT

A method for separating carbon dioxide from a gas flow, in particular from a flue gas flow, where a gas flow is brought in contact with a scrubbing medium in an absorber of a separating device and carbon dioxide contained in the gas
(Continued)

flow is separated, the loaded scrubbing medium is fed to a desorber of the separating device in order to release the carbon dioxide, a vapor flow is drawn from the desorber and is fed to a cooling device in order to form condensate, and the condensate formed in the cooling device is at least partially fed to a purifying device, in which degradation products contained in the condensate are removed by reverse osmosis and/or by an ion exchanger. A separating device is adapted for separating carbon dioxide from a gas flow.

16 Claims, 2 Drawing Sheets

(51) Int. Cl.
*B01D 61/02* (2006.01)
*B01D 53/62* (2006.01)
*B01D 53/96* (2006.01)

(52) U.S. Cl.
CPC ............ *B01D 61/025* (2013.01); *B01D 15/36* (2013.01); *B01D 53/62* (2013.01); *B01D 53/96* (2013.01); *B01D 2252/20494* (2013.01); *B01D 2257/504* (2013.01); *B01D 2258/0283* (2013.01); *B01D 2311/04* (2013.01); *Y02C 10/06* (2013.01)

(58) Field of Classification Search
CPC ...... B01D 2257/504; B01D 2258/0283; B01D 53/1425; B01D 53/1475; B01D 53/62; B01D 53/96; B01D 61/025; Y02C 10/06
See application file for complete search history.

(56) References Cited

U.S. PATENT DOCUMENTS

| 2013/0177489 | A1* | 7/2013 | Dube | B01D 53/62 |
| | | | | 423/220 |
| 2014/0369913 | A1* | 12/2014 | Nakamura | B01D 53/62 |
| | | | | 423/220 |
| 2015/0083964 | A1 | 3/2015 | Fischer et al. | |

FOREIGN PATENT DOCUMENTS

| WO | 2013023918 A1 | 2/2013 |
| WO | 2013023919 A1 | 2/2013 |

* cited by examiner

METHOD FOR SEPARATING CARBON DIOXIDE FROM A GAS FLOW, IN PARTICULAR FROM A FLUE GAS FLOW, AND SEPARATING DEVICE FOR SEPARATING CARBON DIOXIDE FROM A GAS FLOW, IN PARTICULAR FROM A FLUE GAS FLOW

CROSS REFERENCE TO RELATED APPLICATIONS

This application is the US National Stage of International Application No. PCT/EP2014/062187 filed Jun. 12, 2014, and claims the benefit thereof. The International Application claims the benefit of German Application No. DE 102013211757.4 filed Jun. 21, 2013. All of the applications are incorporated by reference herein in their entirety.

FIELD OF INVENTION

The invention relates to a method for separating off carbon dioxide from a gas stream, in particular from a flue gas stream. In addition, the invention relates to a separating device for separating off carbon dioxide from a gas stream, in particular from a flue gas stream.

BACKGROUND OF INVENTION

Against the background of climate changes, it is a global aim to decrease the emission of pollutants into the atmosphere. This applies, in particular, to the emission of carbon dioxide ($CO_2$), which collects in the atmosphere, prevents the radiation of heat away from the earth and thus, as a greenhouse effect, leads to an increase in the surface temperature of the earth.

Particularly in the case of fossil-fueled power plants for generating electrical energy, owing to the combustion of a fossil fuel, a carbon dioxide-containing flue gas forms. To avoid or decrease carbon dioxide emissions into the atmosphere, the carbon dioxide must be separated off from the flue gas. Correspondingly, in particular in the case of existing fossil-fueled power plants, suitable measures are being discussed in order to separate off from the exhaust gas the resultant carbon dioxide after the combustion (post-combustion capture).

As a technical implementation, for this purpose, carbon dioxide present in the flue gas after the combustion is scrubbed out of the respective gas stream by an absorption-desorption process by means of a scrubbing medium and an absorbent. For this purpose, frequently amine-containing scrubbing media are used that exhibit good selectivity and high capacity for carbon dioxide.

At all events, these amine-based scrubbing media have a tendency to the formation of nitrosamines owing to the action of nitrogen oxides ($NO_x$) present in the flue gas as a minor component. In the case of non-volatile amines used as scrubbing media such as amino acid salt solutions, the nitrosamines that possibly result are likewise nonvolatile and therefore not relevant to emissions. However, small amounts of volatile amines can form as thermal and oxidative breakdown products (in particular methylamine) and therefore, nevertheless, generate small amounts of emission-relevant components at a low level.

The amine and/or the nitrosamines correspondingly formed as a secondary product accumulate in the scrubbing medium up to the point where a stable equilibrium is established between the rate of formation of the breakdown products and/or the secondary breakdown products (in total degradation products) and also the ejection thereof from the process. The degradation products concentrate with time in the separation process. On account of the high amounts of flue gas introduced into the separation process and the degradation products concentrating, it is possible in this case for these components to be discharged into the atmosphere. These emissions into the environment are to be prevented.

Correspondingly, in the interim, use has been made of scrubbing media in which as active component an amino acid salt is used. Amino acid salts have the advantage that they do not have a significant vapor pressure, and so discharge from the absorber can be avoided. However, in the use of a scrubbing medium having an amino acid salt as active component, degradation of the scrubbing medium cannot be prevented.

Although the breakdown products of scrubbing media containing amino acid salts are for the most part again salt-type components, which likewise do not have a significant vapor pressure, in the case of amino acid salt-containing scrubbing media, a small part of the degradation or breakdown products can consist of ammonia and highly volatile amines, such as, for example, methylamine. Methylamine serves as precursor for the formation of dimethylamine, which in turn forms the emission-relevant dimethylnitrosamine by reaction with $NO_x$. The nitrosamine, and also other amines accumulate in the scrubbing medium and are co-discharged into the atmosphere via the absorber, via the flue gas that has been purified by removing carbon dioxide.

In order to remove these amines and nitrosamines in a controlled manner, to date, the use of what is termed a reclaimer is usual, which ejects soluble contaminants such as amines from the scrubbing medium. However, an avoidance achieved thereby of impermissible emissions of volatile components may only be achieved by an undesirable loss of scrubbing medium.

In order to circumvent this, for example, a purification device for the gas discharged from the absorber can be used. Such a purification device connected downstream of the absorber, however, is associated with high capital costs and structural complexity.

As a further alternative, in addition to the reclaimer, a purification device can be used which is connected downstream of the desorber. For this purpose, a method is disclosed by WO 2013/023918, in which highly volatile degradation products are separated off from an absorbent circuit of a $CO_2$-separation process. For this purpose, a condensate from a condenser connected downstream of the desorber is fed to a purification device in which the condensate is purified by removal of the degradation products present by distillation or by means of an activated carbon scrubber. Such a method, unfortunately, cannot be carried out economically under certain marginal conditions.

SUMMARY OF INVENTION

It is therefore a first object of the invention to specify a method for separating off carbon dioxide from a gas stream, which method, while maintaining the capacity of the scrubbing medium used, permits a controlled and inexpensively achievable removal of degradation products from a scrubbing medium and simultaneously prevents or as far as possible significantly decreases possible emission of the degradation products into the atmosphere.

A second object of the invention is to specify a separating device for separating off carbon dioxide from a gas stream, with which a corresponding method is implementable.

The first object of the invention is achieved according to the invention by a method for separating off carbon dioxide from a gas stream, in particular from a flue gas stream, in which a gas stream is brought into contact with a scrubbing medium in an absorber of a separating device, with carbon dioxide present in the gas stream being separated off, the loaded scrubbing medium is fed to a desorber of the separating device to liberate the carbon dioxide, a vapor stream is withdrawn from the desorber and fed to a cooling device for formation of a condensate, and the condensate formed in the cooling device is at least in part fed to a purification device in which degradation products present in the condensate are removed by means of reverse osmosis and/or by means of an ion exchanger.

The invention in this case proceeds from the fact that when a scrubbing medium is used having a negligibly low vapor pressure of the respective active components, degradation products form by thermal or oxidative breakdown. In this case, attention is on, in particular, the formation of ammonia and highly volatile amines which serve as precursors for the formation of environmentally harmful nitrosamines. Correspondingly, the amines must be removed from the scrubbing medium in order to prevent the formation of nitrosamines and the emissions thereof into the atmosphere.

Although customary reclaimers can permit a reduction of any amine or nitrosamine emission occurring, this may only be achieved by an undesirable loss of scrubbing medium.

In addition to such a reclaimer, purification devices used are only suitable to a limited extent to permit the preconditions for an economic and readily integrable purification of the scrubbing medium used in a separating process.

Taking into account the above described problems, the invention recognizes the fact that degradation products can effectively and economically be removed from the scrubbing medium when the condensate that is to be treated is fed to a purification device in which the degradation products present in the condensate are removed by means of reverse osmosis and/or by means of an ion exchanger.

In this method, a vapor stream is withdrawn from the desorber, which vapor stream is fed to a cooling device. The vapor stream comprises substantially carbon dioxide, water, and the volatile amines formed in the scrubbing medium. The vapor stream is fed to the cooling device and there condensed. The condensate which comprises substantially water, a small fraction of carbonic acid ($H_2CO_3$), and also a small fraction of ammonia and condensed amines, particularly methylamine, is finally fed to the or each purification device. In this case the condensate can be fed to the purification device either in whole or in part.

By using a purification device in which degradation products present in the condensate are removed by means of reverse osmosis and/or by means of an ion exchanger, the amine contaminants are ejected from the process in a targeted manner. In particular the methylamine present in the condensate, that is to say the precursor for the formation of volatile dimethylnitrosamine, can be removed in this manner.

Losses of the scrubbing medium, as are unavoidable in the operation of the reclaimer, are minimized. For the same degradation rate, either the throughput through the reclaimer can be reduced or, for the same output of the reclaimer, the emissions of volatile degradation products can be further decreased.

The reverse osmosis in this case is either usable together with an ion exchanger or as sole method for purifying the condensate. In a joint use of reverse osmosis with an ion exchanger both method steps proceed expediently one after the other. The sequence in this case may be chosen according to the method and the plant used for carrying out the method.

The contaminated condensate can be inexpensively and simply purified by reverse osmosis. Reverse osmosis is a filtration method which permits ionic contaminants in the molecular range to be filtered out. In this case, the contaminated liquid, in the present case the condensate that is to be purified, is pressed against a filter medium. The contaminants remain upstream of the filter and the condensate penetrates through the filter medium. A semipermeable membrane serves as filter medium. In the reverse osmosis, only a small concentrated stream of contaminants and a large stream of pure water are formed. The clean water can in this case, for example, be recirculated to the process, whereas the contaminated stream can be fed, for example, to a biological treatment plant.

The use of an ion exchanger—as an alternative or in addition to reverse osmosis—also permits simple purification of the condensate. In an ion exchanger, materials are used with which dissolved ions can be replaced by other ions of the same charge. As ion exchangers, for example, a column packed with an ion-exchange material, or a membrane can be used through which, in each case, the solution that is to be treated, that is to say in the present case the condensate that is to be purified, flows. The ions that are to be exchanged are bound to the ion-exchange material, which itself gives into the solution in exchange an equivalent amount of substance of previously bound ions.

The condensate that is to be purified is in this case in particular only a small substream of the entire scrubbing medium, in such a manner that the purification device can be configured to be substantially smaller than a purification device, the capacity of which must be suitable for receiving scrubbing medium from the entire separation process. In addition, purification of the condensate is particularly effectively implementable, since the degradation products in the condensate are concentrated.

Overall, by using reverse osmosis and/or by using an ion exchanger for removing volatile degradation products from a scrubbing medium, a depletion of unwanted amines—in particular methylamine—as precursors for the formation of potentially hazardous nitrosamines—in particular dimethylnitrosamine—in the scrubbing medium and thereby an avoidance of impermissible emissions can be achieved.

In addition, by using a corresponding purification device, interventions may also be made in the water budget of the separating process. To date, the water budget of the separating process is controlled by changing the absorber temperature. In this case, high starting temperatures and an associated high water vapor partial pressure lower the water content of the scrubbing medium. The water vapor is discharged from the absorber together with the purified gas.

For effective absorption of carbon dioxide in the scrubbing medium, however, low temperatures are necessary. At relatively low temperatures, however, water present in the flue gas is condensed in the scrubbing medium and is introduced together therewith into the desorber. The excess water is first removed from the desorber as steam with the scrubbing medium by the high temperatures prevailing in the desorber, together with the amines present in the scrubbing medium and the carbon dioxide.

The present method now permits the absorber to be operated without regard to the water budget at the lowest possible absorber temperatures. This is achieved by a water withdrawal from the purification device—that is to say the reverse osmosis and/or the ion exchanger—by means of which a reduction in the amount of water in the separating process can be implemented energetically more favorably than excessively increased absorber temperatures.

The absorber can be run by the external control of the water budget at low temperatures and therefore as efficiently as technically possible. The condensate that is purified in the purification device can be fed back to the desorber in full or in part, as required. Surplus water can be ejected from the process via the purification device.

Overall, therefore, via a method which, for purification of a condensate contaminated with degradation products, utilizes the principle of reverse osmosis or that of an ion exchange, in addition to the targeted removal of the degradation products from the scrubbing medium, an intervention into the water balance of the separation process is also possible. Via a corresponding mode of operation of the absorber at relatively cold temperatures, in this case, the conditions for the absorption of carbon dioxide in the scrubbing medium are enhanced. As a result, operating costs during the separation of carbon dioxide can be saved.

Also, the use of a corresponding purification device permits in principle the omission of what is termed a flue gas cooler which usually is connected upstream of an absorber of a separating device. In other words, the flue gas is advantageously fed substantially uncooled to the absorber of the separating device. In a flue gas cooler, the flue gas, before entry into the absorber, is cooled, in order thus to provide the conditions necessary for the absorption of carbon dioxide. Although the water input into the separating process is markedly higher when a flue gas cooler is dispensed with, thanks to the control of the water budget via the purification device, or via the corresponding water recirculation from the purification device to the separating process, the increased input can be compensated for.

In an advantageous configuration of the invention, the vapor stream is withdrawn at the top of the desorber. Since the concentration of breakdown and degradation products is highest in the gas phase of the desorber, owing to the temperatures prevailing there, in this manner, substantially complete removal of the amines from the desorber and therefore finally from the scrubbing medium can be achieved. In this manner the precursors of the nitrosamines, in particular methylamine as a precursor of dimethylnitrosamine, are removed and formation thereof prevented.

Further, the condensate that was purified in the purification device by removal of degradation products is recirculated to the desorber. The condensate that is substantially purified water, can either be completely or only partially recirculated, wherein the amount of the recirculated condensate is dependent on the water budget established in the separating process, and can be adapted accordingly depending on the water requirement.

Expediently, the degradation products separated off in the purification device are fed to a utilization appliance. The degradation products separated off are substantially the volatile amines separated off from the condensate and in this case, in particular, methylamine. The amines, owing to their biodegradability, can be, for example, fed to a biological treatment plant without problems, and thus be substantially completely removed from the process.

In a further advantageous embodiment, the cooling device used is a heat exchanger. In the heat exchanger, the vapor stream taken off from the desorber is cooled and condensed, in such a manner that the condensate can be fed—in whole or in part—to the purification device. The carbon dioxide can be separated off from the condensate at this point and be fed, for example, to a treatment appliance. In order to favor the purification of a condensate from a heat exchanger, it is expedient to acidify the condensate slightly by adding a corresponding amount of acid (for example $H_2SO_4$), before introduction into the purification device, with a pH≤6 being particularly advantageous.

It is particularly advantageous when the cooling device used is a scrubbing column. A scrubbing column as cooling device is an amine-selective supplementation to the known reclaimer. It permits a particularly expedient cooling of moist gas, that is to say in the present case of moist carbon dioxide, which directly influences the capital costs during operation of a corresponding separating device for carbon dioxide. The scrubbing column is expediently operated with acidic water, in such a manner that condensate entering into the purification device is already sufficiently acidified.

Expediently, scrubbing medium draining off from the desorber is recirculated to the absorber. In this manner, the scrubbing medium purified in the desorber by removal of carbon dioxide can be fed to the absorber. Within the absorber, the scrubbing medium is then again available for the absorption of carbon dioxide.

Advantageously, the scrubbing medium used is an amino acid salt. An aqueous amino acid salt solution is expedient in this case. The use, in particular, of an aqueous amino acid salt solution is suitable in this case, since an amino acid salt has a negligibly low vapor pressure and does not vaporize even at high temperatures. In particular unwanted emissions into the atmosphere are prevented thereby and in addition a decrease in the concentration of the active component of the scrubbing medium is prevented.

When an amino acid salt is used as scrubbing medium, it is advantageous when an amino acid salt is used which has a carbon substituent from the group which contains hydrogen, an alkyl, a hydroxyalkyl and an amino alkyl. Further, an amino acid salt is used that has a nitrogen substituent from the group that contains hydrogen, an alkyl, a hydroxyalkyl and a haloalkyl. Again, an individual amino acid salt such as, for example, a potassium salt of glycine, or other amino acids can be used. Mixtures of different amino acid salts as absorbents can also be used. Further, the amino acid salt is a salt of a metal, in particular an alkali metal.

The second object of the invention is achieved according to the invention by a separating device for separating off carbon dioxide from a gas stream, in particular from a flue gas stream, comprising an absorber for separating off carbon dioxide from the gas stream by means of a scrubbing medium, and also a desorber that is flow-coupled to the absorber and is for liberating carbon dioxide that is absorbed in the scrubbing medium, wherein a cooling device is flow-connected to the desorber to form condensate, and wherein a purification device is flow-connected to the cooling device, which purification device is equipped and constructed to remove degradation products from the condensate formed in the cooling device by means of reverse osmosis and/or by means of an ion exchanger.

Such a separating device permits a targeted removal of degradation products formed in a scrubbing medium and thereby a reduction in the formation of harmful nitrosamines. At the same time, intervention in the $H_2O$ balance and corresponding mode of operation of the absorber of the separating device is possible at relatively cold temperatures, as a result of which improved conditions are provided for the absorption of carbon dioxide in the scrubbing medium.

The condensate in this case is expediently formed from a vapor stream that is withdrawable from the desorber. Since the concentration of breakdown and degradation products in the gas phase is greatest at the top of the desorber, a discharge line for the withdrawable vapor stream is advantageously connected at the top of the desorber.

For recirculation of purified condensate, the purification device is expediently flow-coupled via a recirculation line to a feed line of the desorber. In this manner, the condensate from which degradation products have been removed, depending on the water requirement, can be either partially or completely recirculated to the desorber and thereby to the separating process.

Advantageously, a discharge line is connected to the purification device, which discharge line opens out into a utilization appliance. In the utilization appliance which is, in particular, a biological treatment plant, the degradation products can be biodegraded.

In an advantageous embodiment, the cooling device used is a heat exchanger by means of which a vapor stream that is withdrawn from the desorber can be condensed.

A particularly expedient and effective possibility for condensing a vapor stream is suggested when the cooling device used is a scrubbing column.

Advantageously, the desorber is flow-coupled via a recirculation line to a feed line of the absorber, in such a manner that the scrubbing medium from which carbon dioxide has been removed in the desorber is fed to the absorber, and within the absorber can again be used for the absorption of carbon dioxide.

Expediently, the cooling device is connected to a discharge line that opens out into a treatment device. In the treatment device, a $CO_2$-rich gas stream can be compressed, in order, for example, to permit the transport to a storage deposit.

Since an amino acid salt has a negligibly low vapor pressure, and does not vaporize even at high temperatures, as scrubbing medium, expediently, such an amino acid salt is used, in particular in the form of an aqueous amino acid salt solution.

Further advantageous embodiments of the separating device for carbon dioxide result from the subclaims directed towards the method for separating off carbon dioxide from a gas stream. The advantages cited for the method can be applied in this case analogously to the separating device.

BRIEF DESCRIPTION OF THE DRAWINGS

Hereinafter, exemplary embodiments of the invention will be described in more detail with reference to a drawing. In the drawing.

DETAILED DESCRIPTION OF INVENTION

Figure 1:
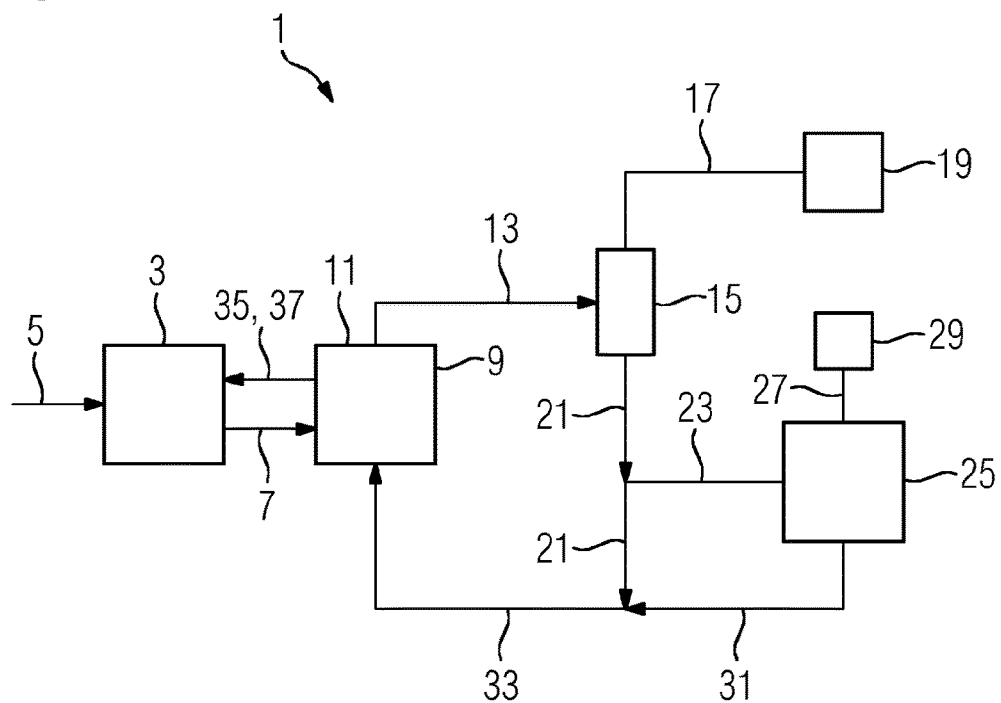
FIG. 1 shows a schematic depiction of a separating device for separating off carbon dioxide having a cooling device and a purification device, and also

FIG. 1 shows a schematic depiction of a separating device 1 for separating off carbon dioxide from a flue gas stream. The separating device 1 comprises an absorber 3 for separating off carbon dioxide from the flue gas stream. For this purpose, flue gas is fed to the absorber 3 via a feed line 5, and the carbon dioxide present in the flue gas is brought into contact in the absorber 3 with a scrubbing medium. The carbon dioxide present in the flue gas is absorbed in the scrubbing medium and fed via a feed line 7 to a desorber 9 that is flow-connected to the absorber 3. In the desorber 9, the carbon dioxide absorbed in the scrubbing medium is liberated by temperature elevation.

Although the amino acid salt used in the present case as scrubbing medium has an extremely low vapor pressure, a small part of the degradation or breakdown products can consist of highly volatile methylamine, which can serve as precursor for the formation of, e.g., dimethylamine. The dimethylamine, in turn, can by reaction with NOx from the flue gas, which is fed to the absorber 3 via the feed line 5, form dimethylnitrosamine which is of relevance to emissions.

In order to prevent emission of unwanted nitrosamines, and at the same time to purify the scrubbing medium correspondingly, via a discharge line 13, a vapor stream is taken off at the top 11 of the desorber 9. The vapor stream contains substantially water, carbon dioxide and the corresponding amines, and is fed to a cooling device 15 that is constructed as a scrubbing column.

In this case, of course, the use of a cooling device 15 that is constructed as a classical heat exchanger is also possible.

In the cooling device 15, the vapor stream is condensed and the gaseous carbon dioxide is fed via a discharge line 17 to a treatment device 19. The scrubbing column 15 is operated with acidified water and provides a condensate having a pH of approximately 6.

The condensate which substantially comprises water and a small part of methylamines, and also a small part of carbonic acid, is withdrawn from the scrubbing column 15 via a discharge line 21 constructed as condensate line and, via a branch line 23, fed to a purification device 25. The feed of the condensate to the purification device 25 in this case proceeds in full.

The purification device 25 is constructed in the present case as a reverse osmosis plant. By means of reverse osmosis, volatile amines are removed from the condensate, wherein a small product stream of degradation products that have been separated off is formed. The degradation products, substantially methylamine and ammonia, are fed via a discharge line 27 to a utilization appliance 29 configured as a biological treatment plant and there correspondingly broken down.

The purified condensate stream, which then contains substantially only purified water, is fed via a recirculation line 31 in part to the desorber 9. For this purpose, the recirculation line 31 of the purification device 25 is flow-coupled to a feed line 33 of the desorber 9. The amount of the water recirculated in this case is fundamentally dependent on the water budget of the separating process and can be correspondingly adapted thereto.

In addition, the desorber 9 is flow-coupled via a recirculation line 35 to a feed line 37 of the absorber 3. By this means, the scrubbing medium that is purified by removal of carbon dioxide can be fed to the absorber 3 and there again utilized for the absorption of carbon dioxide.

Figure 2:
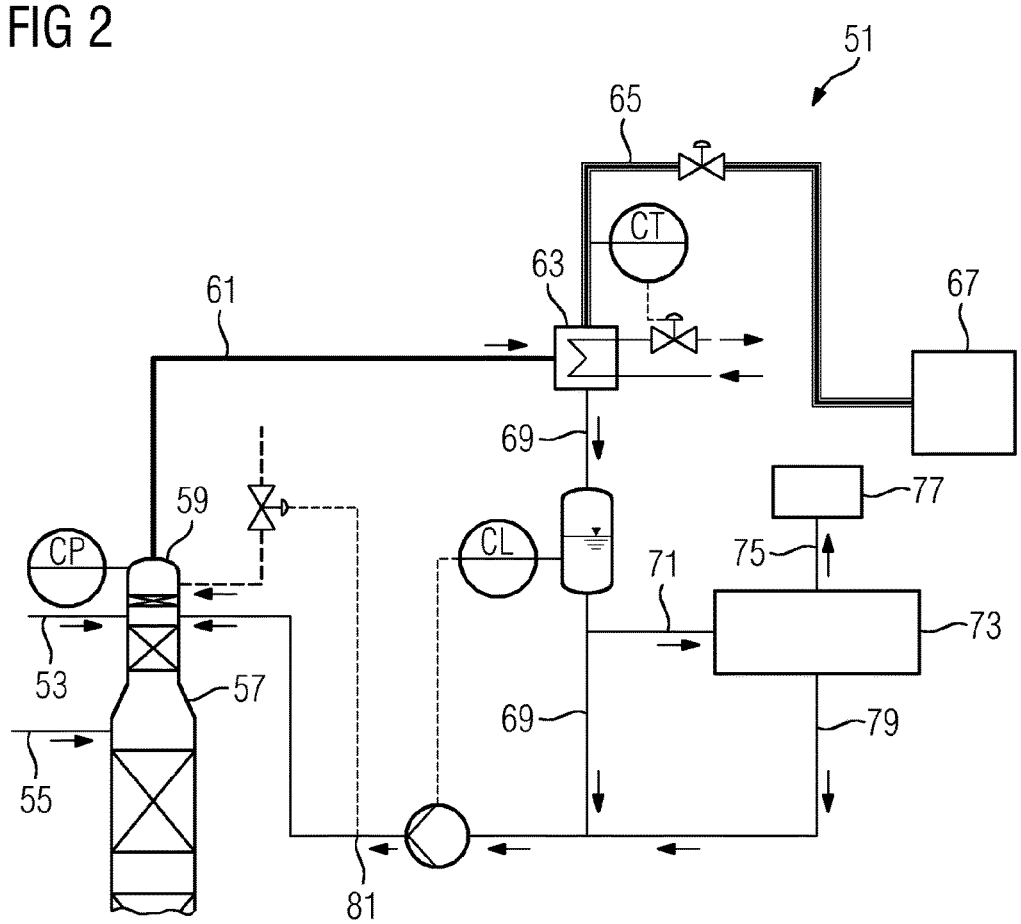
FIG. 2 shows a detail of a further separating device for separating off carbon dioxide having a cooling device and a purification device.

FIG. 2 shows a detail of a further separating device 51 for separating off carbon dioxide from a flue gas stream. The separating device 51 likewise comprises an absorber for separating off carbon dioxide from the flue gas stream by means of an aqueous amino acid salt solution. The absorber cannot be seen in the present case, owing to the detail shown.

The scrubbing medium loaded with carbon dioxide and exiting from the absorber is in the present case fed via two feed lines 53, 55, to a desorber 57 that is flow-connected to the absorber. In the desorber 57, the carbon dioxide absorbed in the scrubbing medium is liberated by temperature elevation.

In the separating device 51, for preventing the formation of nitrosamines, a vapor stream is also taken off at the top 59 of the desorber 57 via a discharge line 61, which vapor stream contains water, carbon dioxide and the amines correspondingly formed in the scrubbing medium. The vapor stream is fed to a cooling device 63 that is constructed as a heat exchanger. In the cooling device 63, the vapor stream is condensed and the gaseous carbon dioxide is fed via a discharge line 65 to a treatment device 67.

The condensate, which in the present case also substantially comprises water and a small part of methylamines, and also a small part of carbonic acid, is withdrawn from the heat exchanger 63 via a discharge line 69 constructed as condensate line, and fed via a branch line 71 to a purification device 73 constructed as an ion exchanger. The feed proceeds in the present case only in part, therefore only a small part of the condensate draining from the heat exchanger 63 is fed to the purification device 73.

In the purification device 73, the condensate is purified by separation from degradation products. The resultant product stream of degradation products that are separated off is fed via a discharge line 75 to a utilization appliance 77, in the present case a biological treatment plant, and there correspondingly broken down.

The purified condensate stream is fed completely to the desorber 77 via a recirculation line 79. For this purpose, the recirculation line 79 of the purification device 73 is flow-coupled to a feed line 81 of the desorber 57.

In addition, the desorber 57 is in the present case also flow-coupled via a recirculation line to a feed line of the absorber, which, however, is not shown on account of the depiction.

The invention claimed is:

1. A method for separating off carbon dioxide from a gas stream, the method comprising:
    bringing a gas stream into contact with a scrubbing medium in an absorber of a separating device, with carbon dioxide present in the gas stream being separated off,
    feeding the loaded scrubbing medium to a desorber of the separating device to liberate the carbon dioxide,
    withdrawing a vapor stream from the desorber and feeding the vapor stream to a cooling device for formation of condensate,
    feeding the condensate formed in the cooling device, at least in part, to a purification device, comprising a reverse osmosis plant
    removing degradation products present in the condensate by reverse osmosis, and recirculating the condensate that was purified in the purification device by removal of degradation products to the desorber.

2. The method as claimed in claim 1, wherein the purification device further comprises an ion exchanger, and
    wherein additional degradation products present in the condensate are removed by the ion exchanger.

3. The method as claimed in claim 1,
    wherein the vapor stream is withdrawn at the top of the desorber.

4. The method as claimed in claim 1, further comprising:
    feeding the degradation products separated off in the purification device to a utilization appliance.

5. The method as claimed in claim 1,
    wherein the cooling device used is a heat exchanger.

6. The method as claimed in claim 1,
    wherein the cooling device used is a scrubbing column, supplied with acidified water.

7. The method as claimed in claim 1, further comprising:
    recirculating the scrubbing medium draining off from the desorber to the absorber.

8. The method as claimed in claim 1,
    wherein the scrubbing medium used is an amino acid salt or the aqueous solution thereof.

9. A separating device for separating off carbon dioxide from a gas stream, comprising
    an absorber for separating off carbon dioxide from the gas stream by a scrubbing medium, and
    a desorber that is flow-coupled to the absorber for liberating carbon dioxide that is absorbed in the scrubbing medium,
    a cooling device flow-connected to the desorber to form a condensate,
    a purification device, comprising a reverse osmosis plant, wherein the purification device is flow-connected to the cooling device,
    wherein the purification device is equipped and constructed to remove degradation products from the condensate formed in the cooling device by reverse osmosis, and
    a recirculation line and a feed line, wherein the reverse osmosis purification device for recirculating purified condensate is flow-coupled via the recirculation line to the feed line of the desorber.

10. The separating device as claimed in claim 9, wherein the purification device further comprises
    an ion exchanger, and
    wherein the purification device is equipped and constructed to remove additional degradation products from the condensate formed in the cooling device by the ion exchanger.

11. The separating device as claimed in claim 9, further comprising:
    a discharge line for a withdrawable vapor stream connected at the top of the desorber.

12. The separating device as claimed in claim 9, further comprising:
    a utilization appliance, and
    a discharge line connected to the purification device, wherein the discharge line opens out into the utilization appliance.

13. The separating device as claimed in claim 9,
    wherein the cooling device used is a heat exchanger.

14. The separating device as claimed in claim 9,
    wherein the cooling device used is a scrubbing column, supplied with acidified water.

15. The separating device as claimed in claim 9, further comprising:
    a recirculation line and a feed line,
    wherein the desorber is flow-coupled via the recirculation line to the feed line of the absorber.

16. The separating device as claimed in claim 9,
    wherein the scrubbing medium used is an amino acid salt.

* * * * *